United States Patent [19]

Kusunoki

[11] Patent Number: 4,979,053
[45] Date of Patent: Dec. 18, 1990

[54] METHOD OF CONTROLLING RECORDING MAGNETIC FIELD APPLIED BY GAP OF MAGNETIC HEAD IN ACCORDANCE WITH RECORDING DENSITY OF DISK AND MAGNETIC APPARATUS THEREFOR

[75] Inventor: Masahiro Kusunoki, Tokyo, Japan

[73] Assignee: Kabushiki Kaisha Toshiba, Kawasaki, Japan

[21] Appl. No.: 243,838

[22] Filed: Sep. 13, 1988

[30] Foreign Application Priority Data

Sep. 14, 1987 [JP] Japan ................................ 62-230035

[51] Int. Cl.⁵ .......................... G11B 5/09; G11B 15/12
[52] U.S. Cl. ......................................... 360/46; 360/61
[58] Field of Search ....................... 360/40, 46, 48, 51, 360/61, 65, 119, 121

[56] References Cited

U.S. PATENT DOCUMENTS

| | | | |
|---|---|---|---|
| 4,644,419 | 2/1987 | Iinuma et al. | 360/46 |
| 4,656,533 | 4/1987 | Sakai et al. | 360/46 |
| 4,724,493 | 2/1988 | Nakamura | 360/40 |
| 4,803,571 | 2/1989 | Fujioka et al. | 360/119 |
| 4,805,047 | 2/1989 | Nasu et al. | 360/46 |

OTHER PUBLICATIONS

"Magnetic Tape Instrumention", by Davis, McGraw-Hill Book Co. Inc., ©1961, p. 15.

*Primary Examiner*—Vincent P. Canney
*Attorney, Agent, or Firm*—Cushman, Darby & Cushman

[57] ABSTRACT

A magnetic disk apparatus comprises an access section including a read/write head, for applying to a magnetic disk a recording magnetic field in a gap of the read/write head in accordance with input generation control data. A discriminator discriminates a recording density of the magnetic disk and outputs recording density data representing the recording density to a access controller. The access controller generates and outputs to the access section the generation control data in accordance with input write data and the recording density data from the discriminator.

19 Claims, 7 Drawing Sheets

METHOD OF CONTROLLING RECORDING MAGNETIC FIELD APPLIED BY GAP OF MAGNETIC HEAD IN ACCORDANCE WITH RECORDING DENSITY OF DISK AND MAGNETIC APPARATUS THEREFOR

BACKGROUND OF THE INVENTION

1. Field of the Invention

The present invention relates to a method of controlling a recording magnetic field applied to a disk through a gap of a magnetic head in accordance with the recording density of the disk, and a magnetic disk apparatus therefor.

2. Description of the Related Art

A small gap of about 0.5 μm may be formed in a read/write core of a magnetic head in a conventional high-density recording magnetic disk apparatus such as one using a vertical magnetic recording system. If the write current is not changed, the depth of magnetization is decreased as the gap length is shortened, as is the case with a high-density recording magnetic head. That is, when magnetic recording is performed by such a magnetic head, a recording magnetic field becomes relatively small, and the depth of magnetic recording becomes shallow as compared with a magnetic head used in a normal low-density recording apparatus, i.e., a magnetic head having a gap length of about 2 μm.

In a high-density recording medium such as a barium-ferrite coating type medium, it is difficult to form a magnetic layer which is thin compared to a magnetization depth. For this reason, data is inevitably recorded in a surface portion of the magnetic layer. When in data is overwritten, previously recorded data may be left in a deep portion of the magnetic layer since a magnetic field, corresponding to data to be newly recorded does not reach a sufficient depth. This prevents an excellent overwrite characteristic.

In order to eliminate the above drawback, a magnetic head using a wide pre-erase system is employed in the above-described high-density recording magnetic disk apparatus. Data recorded in a track is erased by an erase head having a large gap prior to the data write operation. A strong erase magnetic field is generated by the erase head having the large gap. Thus, new data can be recorded after data in a deep portion of the magnetic layer has been reliably erased.

Figure 1:
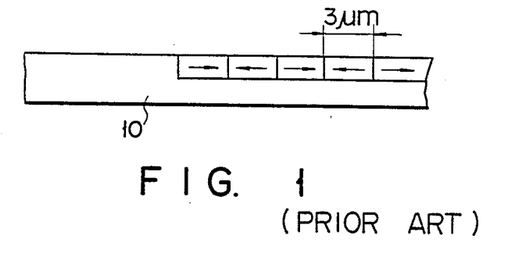
FIG. 1 is a view illustrating the principle of a conventional magnetic recording operation.

Such a high-density recording magnetic disk apparatus is required to be compatible with a low-density recording medium. When low-density recording is performed, the recording wavelength is elongated, and the minimum magnetization reversal interval is about 3 μm. Since the magnetic head has a narrow gap for high-density recording as shown in FIG. 1, the recording depth remains shallow. If the ratio of a magnetization depth to the minimum magnetization reversal interval is decreased, the resolution of a reproduced signal may be degraded. Therefore, when low-density recording is performed using such a high-density recording magnetic head having a small gap, the reproduction resolution is degraded, and hence the reproduction of normal signals may become increasingly difficult.

SUMMARY OF THE INVENTION

The present invention provides a method and apparatus for controlling a recording magnetic field which allows a magnetic disk apparatus using a high-density recording magnetic head having a narrow gap to reliably perform low-density recording with respect to a low-density recording medium and which ensure sufficient compatibility with the low-density recording medium.

The magnetic disk apparatus comprises an access section including a read/write head, for applying to a magnetic disk a recording magnetic field through a gap of the read/write head in accordance with input generation control data, a discriminator for discriminating a recording density of the magnetic disk and outputting recording density data representing the recording density to access controller, and an access controller for generating and outputting to the access section the generation control data in accordance with input write data and the recording density data from the discriminator.

The method comprises discriminating recording density of a magnetic disk, generating generation control data in accordance with a record instruction including write data and the discriminated recording density, and applying to said magnetic disk a recording magnetic field in accordance with the generation control data.

As described above, according to the magnetic disk apparatus of the present invention, a recording magnetic field applied through a magnetic head can be controlled in accordance with the recording density of a disk by utilizing a simple arrangement. Therefore, a read/write operation for a conventional low-density recording medium can be reliably performed in the same manner as that performed for a high-density recording medium. That is, a magnetic disk apparatus which is sufficiently compatible with the conventional low-density recording medium can be obtained.

DETAILED DESCRIPTION OF THE PREFERRED EMBODIMENTS

A magnetic disk apparatus according to an embodiment of the present invention will be described below with reference to the accompanying drawings by describing a floppy disk apparatus which is capable of performing high-and low-density recordings.

Figure 2:
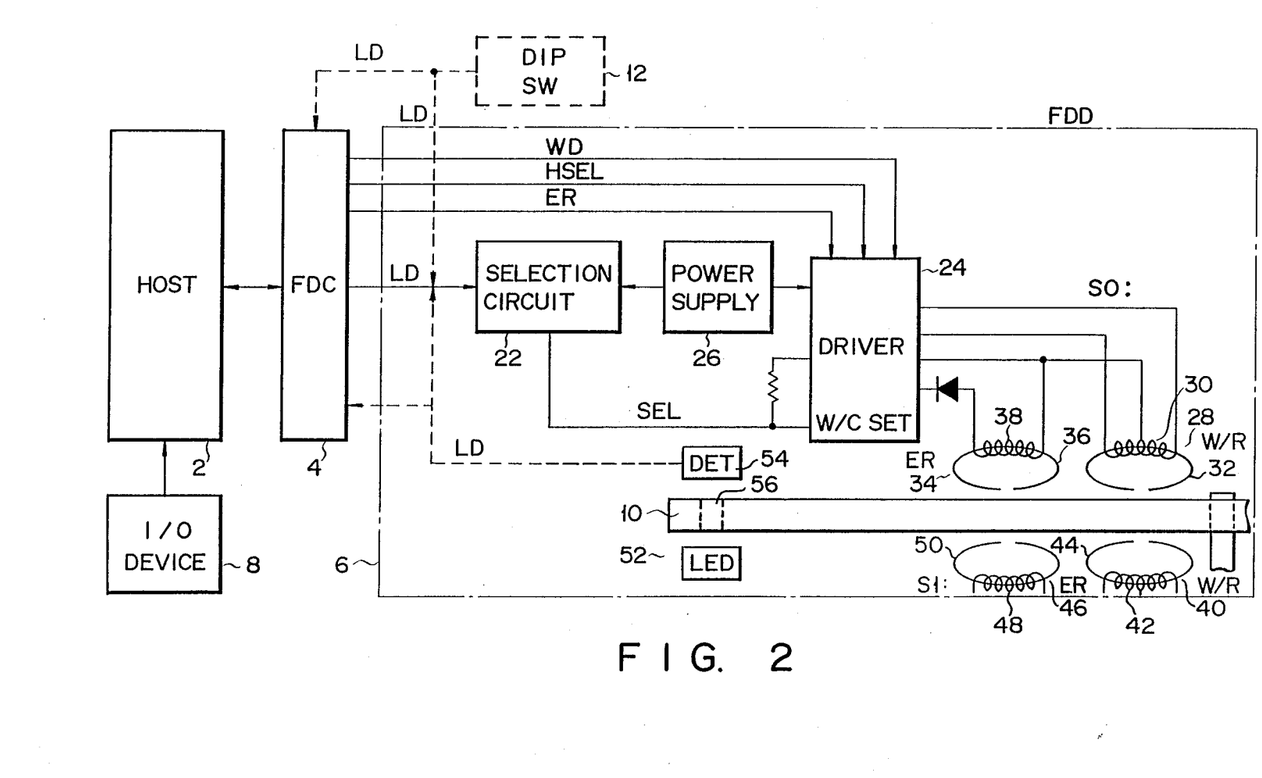
FIG. 2 is a block diagram showing an arrangement of a magnetic disk apparatus according to an embodiment of the present invention.

An arrangement of the embodiment will be described first with reference to FIG. 2. In this embodiment, LED 52, detector 54, and DIP switch 12 shown in FIG. 2 are omitted.

I/0 device 8 is connected to a host 2 to input various commands thereto. In addition, various data are input to host 2 from a floppy disk controller FDC 4. The host 2 generates a new instruction in accordance with input data or an input command, and outputs this new instruction to the FDC 4. Upon reception of the recording density of recording medium (floppy disk) 10, which is inserted into an FDC, from the I/O device 8, the host 2 outputs data representing the recording density to the FDC 4. The FDC 4 outputs a recording density signal LD to a selection circuit 22 and to the host 2. The FDC 4 selectively outputs a write data signal WD and an erase signal ER to a driver 24 in response to a write instruction (including write data) from host 2. In addition, the FDC 4 outputs a signal HSEL to the driver 24 so as to select a surface of disk 10 on which data is to be recorded.

The selection circuit 22 generates a write current control signal SEL by using a current from a power supply 26 in accordance with a signal LD from the FDC 4, and the selection circuit 22 supplies it to the W/C SET terminal of driver 24. The driver 24 controls a current to be supplied from the supply 26 to the read/write head 28 in accordance with signal SEL from the selection circuit 22 and the signal WD from the FDC 4. A current to be supplied from supply 26 to an erase head 34 is controlled by a signal ER from the FDC 4. The read/write head 28 and erase head 34 are made up of a read/write core 32 and an erase core 36 and a read/write coil 30 and erase coil 38 respectively. One end of head 34 is connected to the central point of coil 30. Note that one read/write head 28 and one erase head 34 are present on the surface S0 side of double-sided disk 10. Similarly, the other read/write head 40 and erase head 46 are present on the other surface S1 side.

An arrangement of the read/write head 28 and erase head 34 will be described with reference to FIGS. 5A and 5B.

Figure 5A:
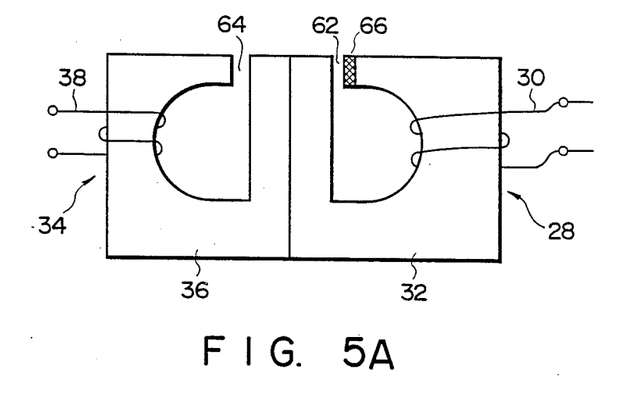
FIGS. 5A and 5B are side and plan views showing an arrangement of a magnetic head.
Figure 5B:
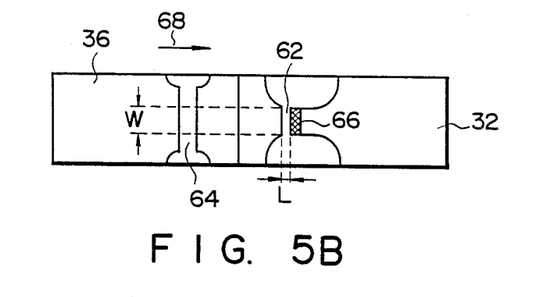

FIGS. 5A and 5B are side and plan views of heads 28 and 34 respectively. As shown in FIG. 5A, read/write head 28 and erase head 34 respectively comprise read/write core 32 and erase core 36 and read/write coil 30 and erase coil 38. A gap 62 of, for example, about 0.5 $\mu$m is formed in the high-density recording read/write head core 32. Read/write core 32 comprises a main body consisting of a ferrite member and high saturation magnetization portion 66 coupled to the ferrite member at gap 62. The high saturation magnetization portion 66 consists of a magnetic material having a high saturation magnetization amount such as sendust (an Fe-Si-Al alloy). That is, read/write gap 62 constitutes a so-called metal in-gap.

Erase head core 36 has a gap 64. As shown in FIG. 5B, erase gap 64 has a width larger than the width W of the read/write gap 62 and a the length larger than length L of gap 62. Erase gap 64 is arranged at a position preceding the read/write gap 66 in a rotating direction of the disk, which is indicated by arrow 68 in FIG. 5B. That is, a wide pre-erase system is constituted by magnetic heads 28 and 34.

Figure 3:
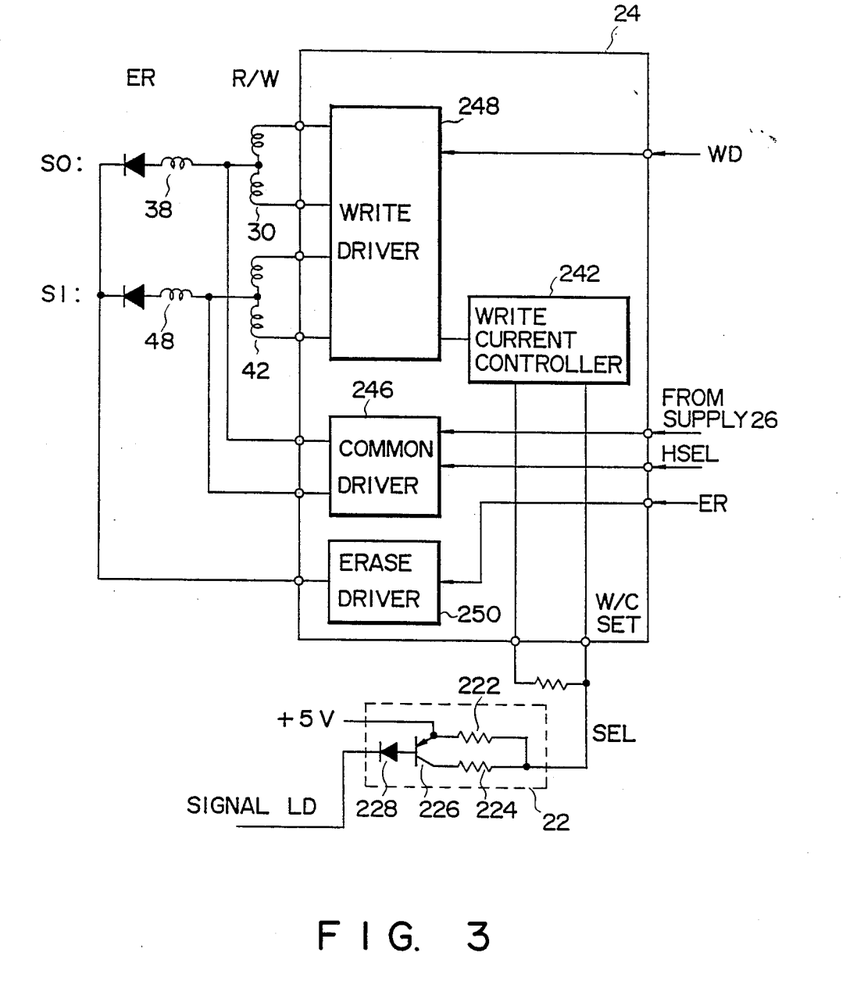
FIG. 3 is a block diagram showing an arrangement of a selection circuit and a driver in the embodiment of FIG. 2.

FIG. 3 is a block diagram showing the selection circuit 22 and driver 24 in detail. The driver 24 is connected though diodes to erase coils 38 and 48 of erase heads 34 and 46 on the surface sides S0 and S1, and the coils 30 and 42 of read/write heads 28 and 40. A currently available IC capable of changing the value of a write current by changing the resistance of an external resistor, e.g., TA8508F available from TOSHIBA CORP., can be used as the driver 24.

Selection circuit 22 comprises resistors 222 and 224, transistor 226, and diode 228. Signal LD is supplied from the host 2 to selection circuit 22 through the FDC 4. When a disk 10 is of a low-density recording type, signal LD is set at logic "L". When it is of a high-density recording type, signal LD is set at logic "H". Assuming that disk 10 for high-density recording is being used, signal LD is set at logic "H", and transistor 226 is turned off. Consequently, a current from the power supply 26 flows through only resistor 222, and is supplied to driver 24 as write current control signal SEL. When disk 10 for low-density recording is used, signal LD is set at logic "L", and transistor 226 is turned on. As a result, a current from supply 26 flows through both resistors 222 and 224, and is supplied to driver 24 as write current control signal SEL.

Driver 24 comprises a write current controller 242 for controlling a write current in accordance with signal SEL supplied to the W/C SET terminal. Write driver 248 drives read/write coils 30 and 42 in accordance with write signal WD from FDC 4. A common driver 246 supplies a drive current to the central taps of read/write coils 30 and 42 in accordance with the current from the power supply 26, and selects a head to be driven in accordance with signal HSEL. When a write operation is to be performed in response to signal WD, a current controlled by the write current controller 242 flows through the read/write coils 30 and 42 due to the write and common drivers 248 and 246. Thus, the recording magnetic fields in the gaps of heads 28 and 40 are controlled.

Figure 8:
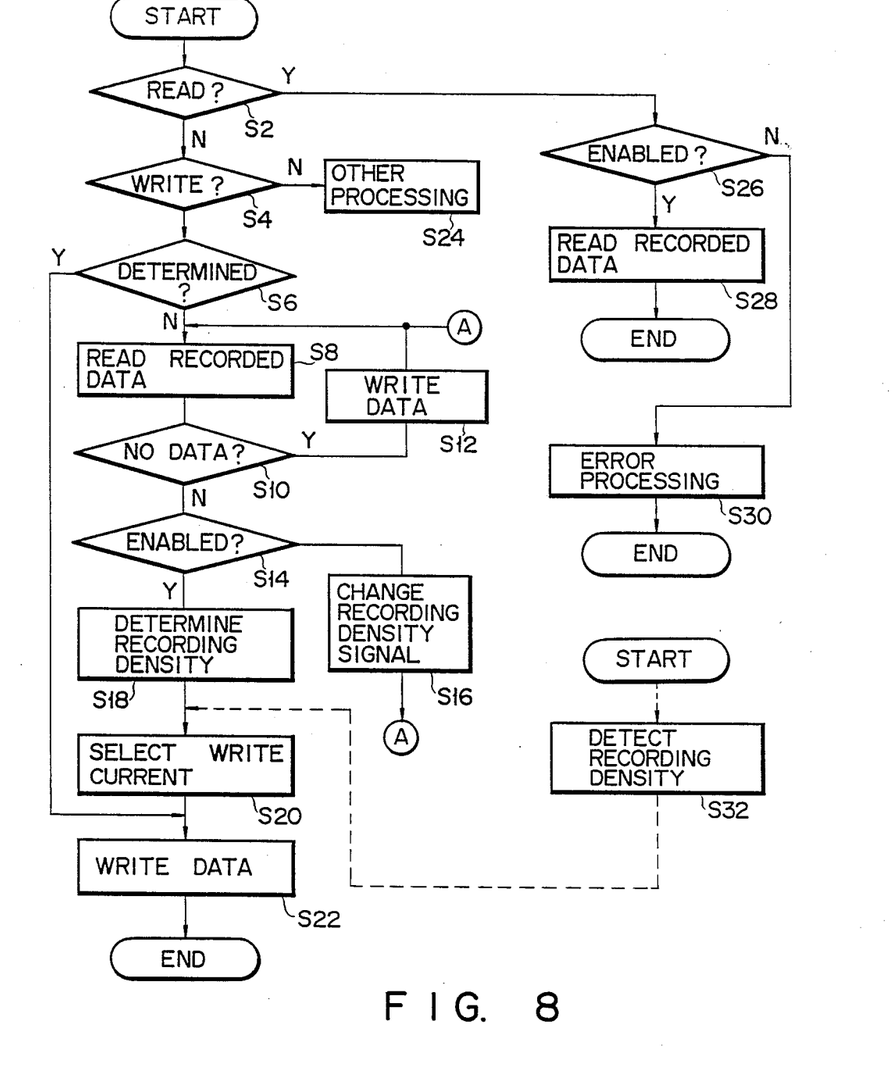
FIG. 8 is a flow chart for explaining the operation of the embodiment.

An operation of the embodiment will be described below with reference to FIG. 8.

Assume that a high-density recording disk 10 having a magnetic film including, e.g., a barium-ferrite-coated film is set. The high-density recording disk includes a disk of a vertical recording system. The host 2 sets a specific recording density when the disk 10 is set in the magnetic disk apparatus, and the host 2 outputs a signal LD to selection circuit 22 through the FDC 4.

When an instruction is output from the host 2, it is determined in step S2 whether it is a read instruction or not. If YES in step S2, step S26 is executed. If NO in step S2, step S4 is executed. In step S4, it is determined whether the instruction is a write instruction or not. If NO in step S4, the flow advances to step S24 and other processing is performed. If YES in step S4, it is determined in step S6 whether or not the recording density of the disk 10 has been determined. When a write access is to be made for the first time after disk 10 is inserted, processing in steps S8 to S18 is executed. If the recording density has been determined, step S22 is directly executed. In this case, since the recording density has not been determined yet, NO is obtained in step S6, and hence step S8 is executed.

In step S8, a read operation for reading out data recorded on disk 10 is executed. In step S10, it is determined whether recorded data is present in disk 10 or not. If no recorded data is present, data is written in step S12, and then step S8 is again executed. If it is determined in step S10 that data has been recorded, it is then determined in step S14 whether or not the data can be read out. If YES in step S14, step S18 is executed. If NO in step S14, i.e., the set recording density is different from the recording density of disk 10, step S16 is executed. In step S16, the currently set recording density is changed. Then, step S8 is again executed. After this trial-and-error, the host 2 determines the recording density of the recording medium set, in step S20. Since disk 10 for high-density recording is used in this case, the host 2 outputs signal LD set at "H" to selection circuit 22 through FDC 4. In step S20, selection circuit 22 generates a write current control signal SEL in accordance with signal LD and outputs this current control signal to driver 24. In driver 24, a write current is controlled by write current controller 242 in accordance with signal SEL. In step S22, a write operation is performed by the controlled write current in accordance with signal WD. As shown in FIGS. 5A and 5B, prior to data writing, the data previously recorded on a track of high-density recording disk 10, whereon new data is to be recorded, is erased by erase head 34 located at a position preceding read/write head 28. Then new data is written on the track, from which the recorded data was erased, at a high frequency, i.e., at short magnetization reversal intervals.

Figure 7:
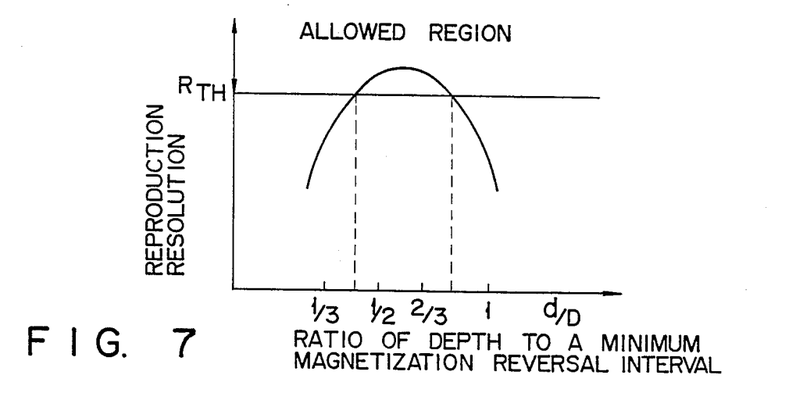
FIG. 7 is a graph for explaining an operation of the embodiment.
Figure 9A:
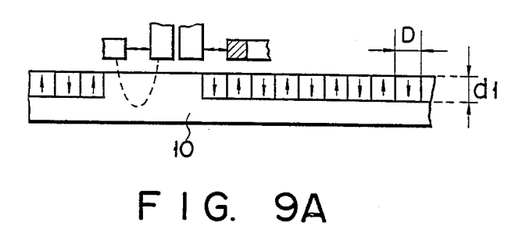
FIGS. 9A to 9C are views, illustrating the principle of magnetic recording, for explaining the operation of the embodiment.
Figure 9B:
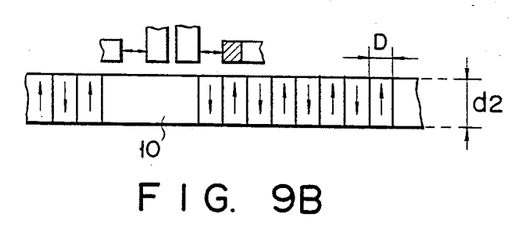

In the present invention, a high saturation magnetization portion 66 is formed in read/write head 28. When read/write coil 30 receives a sufficient write current for a write operation with respect to low-density recording disk 10, high saturation magnetization portion 66 is saturated. Therefore, compared with a magnetic head without high saturation magnetization portion 66, if the gap length remains the same (about 0.5 $\mu$m) a magnetic flux density near the gap 62 is increased. With this arrangement, a relatively large recording magnetic field is applied from the read/write gap 62 of the present invention to disk 10. Therefore, as shown in FIG. 9B, disk 10 is magnetized to a deep layer by the recording magnetic field from read/write gap 62. The magnetization depth in this case corresponds to a value d2 which is larger than normal value d1. It is known that if the value of magnetization depth d becomes excessively large relative to the magnetization reversal interval D (1 $\mu$m or less in high-density recording) of recorded data, the reproduction resolution of the recorded data is degraded, as shown in FIG. 7. If the high saturation magnetization portion 66 is simply formed in the read/write head 28, the level of a reproduced signal is lowered when magnetically recorded data is to be reproduced. Therefore, when high-density recording disk 10 is to be write-accessed, it is required that a write current flowing through read/write head 28 is decreased such that magnetization depth d, (and the reproduction resolution) falls within the allowed region, thereby recording data without saturating the high saturation magnetization portion 66.

In the embodiment, when a high-density recording disk 10 is the write-accessed, a write current is controlled by write current controller 242 in accordance with signal LD. More specifically, since the signal LD is set at logic "H", transistor 226 is turned off. Thus, +5 V is applied to only one resistor 222, and the resistance of selection circuit 22 is increased, thereby restricting the current amount to be supplied to the W/C SET terminal of driver 24. As a result, driver 24 supplies a write current having a relatively low level to read/write coil 30 when high-density recording disk 10 is used. With this operation, as shown in FIG. 9A, data can be recorded in a surface layer of disk 10 at magnetization depth d1 by utilizing a relatively small recording magnetic field from read/write gap 62.

When low-density recording disk 10 having a magnetic film including a gamma-ferrite-coated film is set in the high-density recording magnetic disk apparatus, the recording density of disk 10 is determined in the same manner as described above. As a result, the host 2 outputs signal LD set at logic "L" to selection circuit 22 through FDC 4. In selection circuit 22, transistor 226 is turned on, and a current flowing through resistors 222 and 224 is supplied to driver 24 as signal SEL. At this time, the value of the current is higher than that supplied when signal LD is set at logic "H" because resistors 222 and 224 are connected in parallel. As a result, high saturation magnetization portion 66 can be saturated, and hence a relatively large recording magnetic field is applied from read/write gap 62.

Figure 9C:
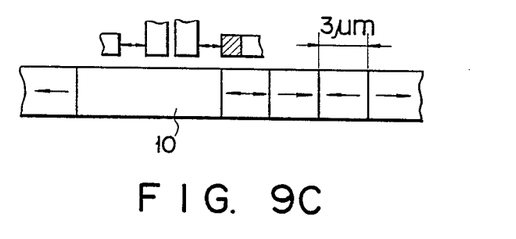

With this operation, a magnetization depth can be obtained such that the reproduction resolution falls within the allowed region shown in FIG. 7 even at a long magnetization reversal interval (about 3 $\mu$m) as shown in FIG. 9C. Thus, in the high-density recording magnetic disk apparatus, when data is recorded either on a low-density recording disk or on a high-density recording disk, a magnetization interval and a magnetization depth can be maintained within an optimal range.

If YES is obtained in step S2, it is determined in step S26 whether or not a read operation can be performed. If YES in step S6, recorded data is read out in step S28. If NO in step S6, error processing is executed in step S30. In the error processing step, the FDC 4 signals an error to device 8 through host 2.

In the above-described embodiment, the recording density of disk 10 is input from I/0 device 8 to host 2, and is supplied to selection circuit 22 as a signal LD through FDC 4. However, as indicated by dotted lines in FIG. 2, signal LD may be supplied from a DIP switch 12 to selection circuit 22. Furthermore, in order to determine the recording density of disk 10, an outer feature such as hole 56 may be formed in a cartridge accommodating the disk or in the disk itself. In this case, the hole 56 is formed in floppy disk 10 for high-density recording, however, no such hole is formed in floppy disk 10 for low-density recording. When floppy disk 10 is of a high-density recording type, a light emitted from LED 52 is detected by a detector 54 through the hole 56 in step S32, as shown in FIG. 8. As a result, the signal LD is supplied to selection circuit 22. Thereafter, step S20 is executed. Signal LD may be supplied to the FDC 4 when either a DIP switch 12 or a hole 56 of disk 10 is used. This is because the host 2 may be required to be informed of the recording density of disk 10.

Figure 6A:
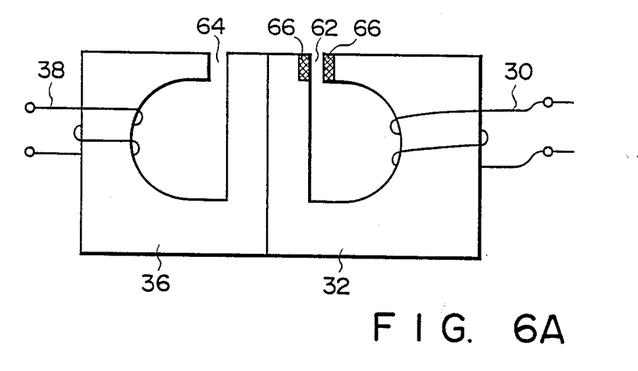
FIGS. 6A and 6B are side views showing other arrangements of the magnetic head.
Figure 6B:
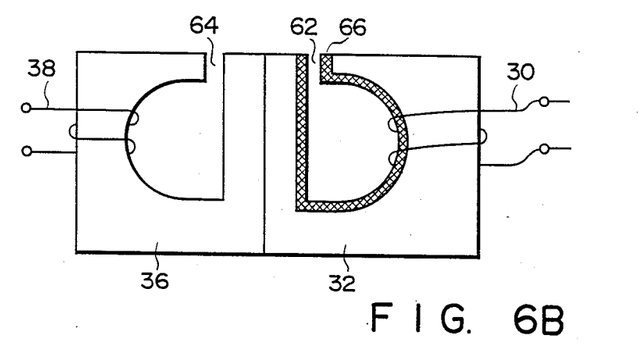

High saturation magnetization portion 66 of the read/write head is not limited to only one end portion of the gap. However, both end portions of the head may have such a high saturation magnetization portion formed thereon, as shown in FIG. 6A. In addition, as shown in FIG. 6B, a high saturation magnetization portion 66 may be formed along a magnetic field generated by a write current. With this arrangement, the reproduction resolution can be further improved.

Figure 4:
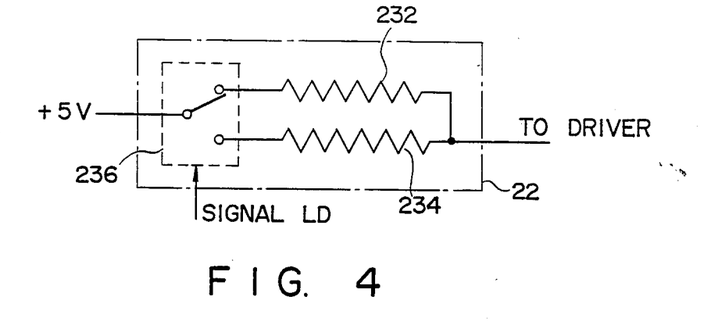
FIG. 4 is a block diagram showing another arrangement of the selection circuit.

Moreover, selection circuit 22 may be arranged as shown in FIG. 4, i.e., it may be constituted by switch 236, and resistors 232 and 234. One of resistors 232 and 234 is selected by signal LD.

Figure 10A:
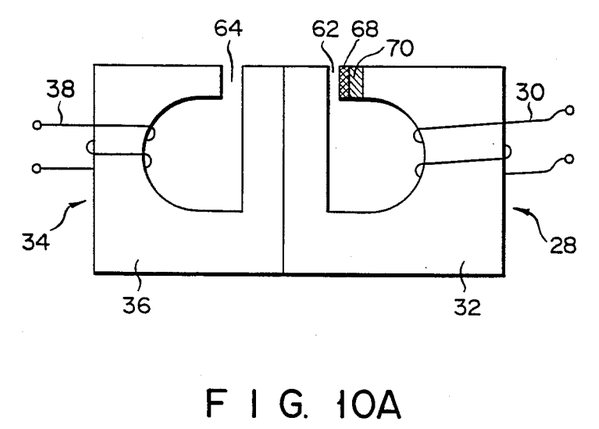
FIGS. 10A and 10B are side and plan views showing another arrangement of a magnetic head.
Figure 10B:
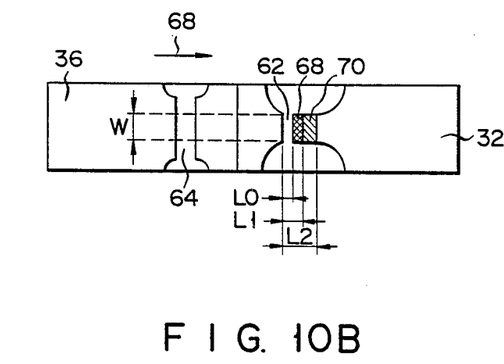

In the above embodiment, two types of recording magnetic fields may be used, depending upon the recording density of a recording medium. However, the recording density can not always be classified into two types. It may happen that the recording density should be classified into three types or more. In this case, two low saturation magnetization portions 68 and 70 are provided for read/write gap 62 of read/write head 28, as is indicated in FIGS. 10a and 10b. Magnetization portion 68 is saturated with a lower magnetic flux density than that of magnetization portion 70, and magnetization portion 70 is saturated with a lower magnetic flux density than that of the core 32. Therefore, in the case where the current supplied to the read/write coil 30 is gradually increased, the magnetization portion 68 will remain unsaturated in the initial stage and the substantial gap length will be Lo. If the current is further increased, magnetization portion 68 will be saturated, while magnetization portion 70 will remain unsaturated. In this stage, the substantial gap length will be L1. If the current is still further increased, magnetization portion 70 will also be stage and its substantial gap length will be L2. By changing the substantial gap length in this fashion, the recording density can be classified into three or more types.

In the above explanation, the present invention was explained in detail taking a floppy disk apparatus as an example. This, however, does not limit the present invention. The present invention may be applied to any type of magnetic disk apparatus capable of handling a magnetic recording media having different recording densities. For example, the present invention may be applied to a hard disk apparatus of the type which permits replacement of one magnetic recording medium with another.

What is claimed is:

1. A magnetic disk apparatus for reading recorded data from and/or recording write data on a magnetic disk, comprising:
   discriminating means for discriminating a recording density of said magnetic disk and outputting recording density data representing the recording density;
   selecting means comprising first and second resistive elements and output means for selectively outputting as selection data one of a first current flowing from said first resistive element and a second current flowing from said first and second resistive elements in accordance with the recording density data from said discriminating means;
   generation control means for generating and outputting generation control data in accordance with write data and the selection data from said selecting means; and
   access means including a read/write head for applying a recording magnetic field generated in a gap of said read/write head to said magnetic disk and for recording the write data on said magnetic disk in accordance with generation control data from said generation control means.

2. A magnetic disk apparatus for reading recorded data from and/or recording write data on a magnetic disk, comprising:
   discriminating means for discriminating a recording density of said magnetic disk and outputting recording density data representing the recording density;
   selecting means comprising a plurality of resistive elements having different resistances to each other and switching means for selecting one of said resistive elements and for outputting a current flowing from said selected resistive element in accordance with the recording density data from said discriminating means;
   generation control means for generating and outputting generation control data in accordance with write data and the selection data from said selecting means; and
   access means including a read/write head for applying a recording magnetic field generated in a gap of said read/write head to said magnetic disk and for recording the write data on said magnetic disk in accordance with generation control data from said generation control means.

3. A magnetic disk apparatus for reading out recorded data from and/or recording write data on a magnetic disk comprising:
   discriminating means for discriminating a recording density of said magnetic disk and outputting recording density data representing the recording density;
   access control means for generating and outputting generation control data in accordance with the write data and the recording density data from said discriminating means;
   access means including a read/write head for applying a recording magnetic field generated in the gap of said read/write head to said magnetic disk in accordance with generation control data on said magnetic disk, wherein said read/write head includes a core with a gap and a magnetic material having a saturation magnetic flux density higher than that of said core and being coupled to said core at the gap.

4. A magnetic disk apparatus for reading recorded data from and/or recording write data on a magnetic disk, comprising:
   discriminating means for discriminating a recording density of said magnetic disk, said means being responsive to an input write instruction for reading out the recorded data from said magnetic disk, for determining the recording density of said magnetic disk, and for outputting recording density data representing the recording density;
   access control means for generating and outputting generation control data in accordance with the write data and the recording density data from said discriminating means.
   generation control means for generating and outputting generation control data in accordance with write data and the selection data from said selecting means; and
   access means including a read/write head for applying a recording magnetic field generated in a gap of said read/write head to said magnetic disk and for recording the write data on said magnetic disk in accordance with generation control data from said generation control means.

5. A magnetic disk apparatus for reading recorded data from and/or recording write data on a magnetic disk, comprising:
   discriminating means for discriminating a recording density of said magnetic disk and outputting recording density data representing the recording density;
   access control means for generating and outputting first and second generation control data in accordance with the write data and the recording density data from said discriminating means;

first access means including a first read/write head for applying a first recording magnetic field generated in a gap of said first read/write head to said magnetic disk and for recording the write data on said magnetic disk in accordance with said first generation control data from said access control means;

second access means including a second read/write head for applying a second recording magnetic field generated in a gap of said second read/write head to said magnetic disk in accordance with said second generation control data.

6. A method of recording write data on a magnetic disk in accordance with the recording density of said magnetic disk, comprising:

discriminating the recording density of said magnetic disk;

selecting, as control data one of a first current flowing from a first resistive element and a second current flowing from said first resistive element and a second resistive element in accordance with the discriminated recording density;

generating generation control data in accordance with a record instruction including the write data and the control data; and selectively applying to said magnetic disk a recording magnetic field in accordance with the generation control data.

7. A method of recording write data on a magnetic disk in accordance with the recording density of said magnetic disk, comprising:

discriminating the recording density of said magnetic disk;

selecting one of a plurality of resistive elements in accordance with the discriminated recording density to determine, as the control data, a current flowing from said selected resistive element, said plurality of resistive elements having different resistances to each other;

generating generation control data in accordance with a record instruction including the write data and the control data;

selectively applying to said magnetic disk a recording magnetic field in accordance with the generation control data.

8. A method for recording write data on a magnetic disk in accordance with the recording density of said magnetic disk, comprising:

discriminating the recording density of said magnetic disk;

generating generation control data in accordance with the record instruction including the write data and the discriminated record density; and selectively applying to said magnetic disk a recording magnetic field in with a read/write head accordance with the generation control data, said read/write head including a core having a gap and a magnetic substance having a saturation magnetic flux density higher than that of the core and coupled to the core at the gap.

9. A magnetic disk apparatus capable of recording write data on a magnetic disk having either a first minimum magnetization reversal interval (MMRI) or a second MMRI without degradation of reproduction resolution, the first MMRI being shorter than the second MMRI, comprising:

discriminating means for discriminating whether the magnetic disk has the first or second MMRI to generate MMRI data;

selecting means for selecting selection data in accordance with the MMRI data, said selecting means including first and second resistive elements, and output means for selectively outputting one of a first current flowing from said first resistive element and a second current flowing from said first and second resistive elements as the selection data;

generation control means for generating and outputting generation control data in accordance with the selection data and the write data; and access means including a read/write head, for applying a recording magnetic field generated in a gap of said read/write head to said magnetic disk in accordance with generation control data to record the write data on said magnetic disk, a magnetization depth of the recording magnetic field being deeper for a magnetic disk having the second MMRI than a magnetic disk having the first MMRI.

10. A magnetic disk apparatus capable of recording write data on a magnetic disk having either a first minimum magnetization reversal interval (MMRI) or a second MMRI without degradation of reproduction resolution, the first MMRI being shorter than the second MMRI, comprising:

discriminating means for discriminating whether the magnetic disk has the first or second MMRI to generate MMRI data;

selecting means for selecting selection data in accordance with the MMRI data, said selecting means including
(i) a plurality of resistive elements having different resistances to each other, and
(ii) switching means for selecting one of said resistive elements in accordance with the MMRI data and for outputting a current flowing from said selected resistive element as the selection data;

generation control means for generating and outputting generation control data in accordance with the selection data and the write data; and access means including a read/write head, for applying a recording magnetic field generated in a gap of said read/write head to said magnetic disk in accordance with generation control data to record the write data on said magnetic disk, a magnetization depth of the recording magnetic field being deeper for a magnetic disk having the second MMRI than a magnetic disk having the first MMRI.

11. A magnetic disk apparatus capable of recording write data on a magnetic disk having either a first minimum magnetization reversal interval (MMRI) or a second MMRI without degradation of reproduction resolution, the first MMRI being shorter than the second MMRI, comprising:

discriminating means for discriminating whether the magnetic disk has the first or second MMRI to generate MMRI data;

access control means for generating and outputting generation control data in accordance with the write data and the MMRI data from said discriminating means; and access means including a read/write head, for applying a recording magnetic field generated in a gap of said read/write head to said magnetic disk in accordance with generation control data to record the write data on said magnetic disk, a magnetization depth of the recording magnetic field being deeper for a magnetic disk having the second MMRI than a magnetic disk having the first MMRI;

wherein said read/write head includes a core and a magnetic material having a saturation magnetic flux density higher than that of said core and provided at the gap of said core to form the gap.

12. A method of recording write data on a magnetic disk in accordance with the minimum magnetization reversal interval (MMRI) of said magnetic disk, comprising:

discriminating the MMRI of said magnetic disk;

selecting, as control data, one of a first current flowing from a first resistive element and a second current flowing from said first resistive element and a second resistive element in accordance with the discriminated MMRI; and generating generation control data in accordance with the control data and the write data; and selectively applying to said magnetic disk a recording magnetic field in accordance with the generation control data, a ratio of depth of the recording magnetic field in said magnetic disk to the MMRI falling within a predetermined range.

13. A method of recording write data on a magnetic disk in accordance with the minimum magnetization reversal interval (MMRI) of said magnetic disk, comprising:

discriminating the MMRI of said magnetic disk;:

selecting one of a plurality of resistive elements in accordance with the discriminated MMRI to determine, as control data, a current flowing from said selected resistive element, said plurality of resistive elements having different resistances to each other; and generating generation control data in accordance with the control data and the write data; and selectively applying to said magnetic disk a recording magnetic field in accordance with the generation control data, a ratio of depth of the recording magnetic field in said magnetic disk to the MMRI falling within a predetermined range.

14. A method of recording write data on a magnetic disk in accordance with the minimum magnetization reversal interval (MMRI) of said magnetic disk, comprising:

discriminating the MMRI of said magnetic disk;

selecting control data in accordance with the discriminated MMRI; and generating the generation control data in accordance with the control data and the write data;

selectively applying to said magnetic disk a recording magnetic field in accordance with the generation control data, a ratio of depth of the recording magnetic field in said magnetic disk to the MMRI falling within a predetermined range, said recording magnetic field applied with a read-/write head including a core having a gap and a magnetic substance having a saturation magnetic flux density higher than that of the core and coupled to the core at the gap.

15. A magnetic disk apparatus for recording write data on a magnetic disk in accordance with a magnetic recording characteristic of said magnetic disk without degradation of reproduction resolution, comprising:

discriminating means for discriminating the magnetic recording characteristic of said magnetic disk to generate characteristic data;

selecting means for selecting selection data in accordance with the characteristic data, said selecting means including:
(i) first and second resistive elements; and
(II) output means for selectively outputting to said generation control means one of a first current flowing from said first resistive element and a second current flowing from said first and second resistive elements, as the selection data;

generation control means for generating and outputting to said access means the generation control data in accordance with the selection data and the write data; and access means, including a magnetic head, for applying a recording magnetic field to said magnetic disk by said magnetic head having an effective gap length to record the write data on said magnetic disk, the recording magnetic field being generated in accordance with the generation control data, the effective gap length being determined in accordance with the recording magnetic field.

16. A magnetic disk apparatus for recording write data on a magnetic disk in accordance with a magnetic recording characteristic of said magnetic disk without degradation of reproduction resolution, comprising:

discriminating means for discriminating the magnetic recording characteristic of said magnetic disk to generate characteristic data;

selecting means for selecting selection data in accordance with the characteristic data;

generation control means for generating and outputting generation control data in accordance with the selection data and the write data, said selecting means including:
(i) a plurality of resistive elements having different resistances to each other; and
(ii) switching means for selecting one of said resistive elements in accordance with the characteristic data and for outputting a current flowing from said selected resistive element as the selection data; and access means, including a magnetic head, for applying a recording magnetic field to said magnetic disk by said magnetic head having an effective gap length to record the write data on said magnetic disk, the recording magnetic field being generated in accordance with the generation control data, the effective gap length being determined in accordance with the recording magnetic field.

17. A magnetic disk apparatus for recording write data on a magnetic disk in accordance with a magnetic recording characteristic of said magnetic disk without degradation of reproduction resolution, comprising:

discriminating means for discriminating the magnetic recording characteristic of said magnetic disk to generate characteristic data;

access control means for generating and outputting generation control data in accordance with the write data and the characteristic data from said discriminating means; and access means, including a magnetic head, for applying a recording magnetic field to said magnetic disk by said magnetic head having an effective gap length to record the write data on said magnetic disk, the recording magnetic field being generated in accordance with the generation control data, the effective gap length being determined in accordance with the recording magnetic field, said magnetic head including a core and a magnetic material portion having a saturation magnetic flux density lower than that of said core and provided at a gap of said core.

18. An apparatus according to claim 17, wherein said magnetic material portion comprises a plurality of sections which have a saturation magnetic flux density higher than that of an adjacent one closer to the gap.

19. An apparatus according to claim 17, wherein a saturation magnetic flux density of said magnetic material portion continuously increases in a direction form the gap to the core.

* * * * *